(12) United States Patent
Shortlidge et al.

(10) Patent No.: US 8,596,034 B2
(45) Date of Patent: Dec. 3, 2013

(54) HYBRID POWER GENERATION CYCLE SYSTEMS AND METHODS

(75) Inventors: Seth Shortlidge, St. Augustine, FL (US); Gregory J. Cahill, Braintree, MA (US)

(73) Assignee: EIF NTE Hybrid Intellectual Property Holding Company, LLC, Needham, MA (US)

( * ) Notice: Subject to any disclaimer, the term of this patent is extended or adjusted under 35 U.S.C. 154(b) by 564 days.

(21) Appl. No.: 12/751,830

(22) Filed: Mar. 31, 2010

(65) Prior Publication Data
US 2011/0062712 A1 Mar. 17, 2011

(51) Int. Cl.
F02C 6/00 (2006.01)
F01K 13/00 (2006.01)

(52) U.S. Cl.
USPC .............. 60/39.182; 60/653; 60/676; 60/677

(58) Field of Classification Search
USPC .................. 60/39.182, 653, 676, 677–679
See application file for complete search history.

(56) References Cited

U.S. PATENT DOCUMENTS

| | | |
|---|---|---|
| 3,937,024 A | 2/1976 | Durrant et al. |
| 4,013,877 A | 3/1977 | Uram et al. |
| 4,060,990 A | 12/1977 | Guido et al. |
| 4,069,675 A | 1/1978 | Adler et al. |
| 4,195,231 A * | 3/1980 | Reed et al. ............. 290/40 R |
| 4,288,979 A | 9/1981 | Liljedahl et al. |
| 4,326,382 A | 4/1982 | Baardson |
| 4,414,813 A | 11/1983 | Knapp |
| 4,541,247 A | 9/1985 | Martin |
| 5,319,934 A | 6/1994 | Parker, III et al. |
| 5,442,908 A | 8/1995 | Briesch et al. |
| 5,581,128 A | 12/1996 | Royle |
| 5,607,011 A | 3/1997 | Abdelmalek |
| 5,649,416 A | 7/1997 | Moore |
| 5,720,165 A | 2/1998 | Rizzie et al. |
| 5,724,807 A | 3/1998 | Schuetzenduebel et al. |
| 5,761,896 A | 6/1998 | Dowdy et al. |
| 5,822,974 A * | 10/1998 | McGowin et al. ......... 60/39.182 |
| 6,065,280 A | 5/2000 | Ranasinghe et al. |
| 6,116,017 A | 9/2000 | Mori et al. |
| 6,244,039 B1 | 6/2001 | Sugishita et al. |
| 6,339,926 B1 | 1/2002 | Ichiro et al. |
| 6,430,914 B1 | 8/2002 | Goidich et al. |
| 6,497,102 B2 | 12/2002 | Liebig |
| 6,604,354 B2 | 8/2003 | Oto et al. |

(Continued)

OTHER PUBLICATIONS

Mouawad, Jad, "The Newest Hybrid Model", New York Times, 2 pages, Mar. 4, 2010.

(Continued)

*Primary Examiner* — Hoang Nguyen
(74) *Attorney, Agent, or Firm* — Pierce Atwood LLP; Joseph M. Maraia

(57) ABSTRACT

Methods and systems for the generation of electrical energy through the combination of steam flows produced from different fuel sources. Steam produced from processing of a biomass fuel source is combined with steam produced from the processing of natural gas or fossil fuel and routed through a steam turbine generator to produce electrical energy. The steam is preferably reheated after partial processing in the steam turbine generator and then recirculated for further processing in the steam turbine generators. Following extraction of all available energy from the steam, the condensed wet vapor is reheated and used for processing of both energy sources.

16 Claims, 2 Drawing Sheets

(56) References Cited

U.S. PATENT DOCUMENTS

| | | |
|---|---|---|
| 6,606,848 B1 | 8/2003 | Rollins, III |
| 6,663,777 B2 | 12/2003 | Schimel |
| 6,748,733 B2 | 6/2004 | Tamaro |
| 6,817,186 B2 | 11/2004 | Tanaka |
| 6,923,004 B2 | 8/2005 | Chandran et al. |
| 6,957,540 B1 | 10/2005 | Briesch et al. |
| 6,966,190 B2 | 11/2005 | Wylie |
| 7,272,934 B2 * | 9/2007 | Chandran et al. .............. 60/781 |
| 7,299,637 B2 | 11/2007 | Becker |
| 7,331,178 B2 | 2/2008 | Goldman |
| 7,367,177 B2 | 5/2008 | Briesch |
| 7,377,107 B2 | 5/2008 | Sugioka |
| 7,596,939 B2 | 10/2009 | Kataoka et al. |
| 7,640,750 B2 * | 1/2010 | Saviharju et al. .............. 60/653 |
| 7,803,333 B2 | 9/2010 | Buchert |
| 7,841,304 B2 | 11/2010 | Van Wees et al. |
| 7,845,172 B2 | 12/2010 | Goldman |
| 8,056,316 B2 | 11/2011 | Poline |
| 2003/0136127 A1 | 7/2003 | Thiessen |
| 2005/0034445 A1 | 2/2005 | Radovich |
| 2006/0225428 A1 | 10/2006 | Brostmeyer |
| 2007/0012041 A1 | 1/2007 | Goldman |
| 2007/0084208 A1 | 4/2007 | Goldman |
| 2007/0157614 A1 | 7/2007 | Goldman |
| 2007/0271899 A1 | 11/2007 | Nakagawa et al. |
| 2008/0000237 A1 | 1/2008 | Briesch et al. |
| 2008/0000436 A1 | 1/2008 | Goldman |
| 2008/0115500 A1 | 5/2008 | MacAdam et al. |
| 2009/0031698 A1 | 2/2009 | Brown et al. |
| 2009/0094983 A1 | 4/2009 | Goto et al. |
| 2009/0183693 A1 | 7/2009 | Furman |
| 2009/0282738 A1 | 11/2009 | Tharpe, Jr. |
| 2010/0003741 A1 | 1/2010 | Fromson |
| 2011/0016789 A1 | 1/2011 | Nukumi et al. |
| 2011/0146155 A1 | 6/2011 | Bentzen |
| 2011/0209647 A1 | 9/2011 | Mitchell et al. |

OTHER PUBLICATIONS

Florida Power & Light Company's Petition for Solar Energy Projects for Recovery through Environmental Cost Recovery Clause before the Florida Public Service Commission (May 16, 2008), 21 pages.

Florida Power & Light Company's Petition for Solar Energy Projects for Recovery through Environmental Cost Recovery Clause before the Florida Public Service Commission, Direct Testimony and Exhibits of Eric Silagy (May 16, 2008), 85 pages.

International Search Report; International Searching Authority; PCT/US2011/081899; Dec. 14, 2011.

* cited by examiner

HYBRID POWER GENERATION CYCLE SYSTEMS AND METHODS

FIELD

This invention relates generally to methods and systems for the generation of electrical power through the combination of a biomass combustion system and a conventional energy system such as a natural gas or other fossil fuel combustion system. More specifically, the invention is directed at methods and systems for the combination of steam outputs from a biomass combustion cycle with the steam output of a natural gas or other fossil fuel fired combined cycle plant to generate electrical power.

BACKGROUND

The use of biomass as a means to generate electrical power is well established in the pulp and paper industry. Biomass has also been used in standalone power generation facilities. One of the drawbacks to power generation technology using biomass as a fuel, based on the generation of steam, is the inherent low efficiency of its power generation cycle relative to that of a natural gas or other fossil fuel fired power plant. This lower level of efficiency for power generation using biomass fuel sources stems from two main deficiencies. First, the moisture content of the biomass fuel is usually above 40%, which decreases the combustion efficiency of the boiler. Second, the size of the biomass fuel fired power plant is usually less than 50 MW, which results in a less efficient steam cycle than a much larger natural gas or fossil fuel fired power plant. The present disclosure seeks to overcome these and other deficiencies by combining the steam generated from biomass processing with steam generated from a natural gas or other fossil fuel cycle.

SUMMARY

The present disclosure is directed to systems and methods for power generation through the combination of a biomass fuel combustion cycle and a natural gas or other fossil fuel fired cycle. In general, the combined cycle format utilizes the steam from the biomass boiler with the steam output from a traditional gas turbine. Inefficiencies of a traditional biomass power plant are overcome through this combination.

The process for the generation of steam from the two sources is kept separate. Steam from the biomass source is combined with steam from the natural gas or other fossil fuel cycle and flows to a steam turbine generator. An exemplary embodiment of the present disclosure will now be described. In the exemplary embodiment, the combined steam flows are passed through the high pressure section of the steam turbine generator. The heat recovery steam generator (HRSG) that is used to produce steam from the natural gas combustion cycle is also used to reheat the combined steam flow leaving the high pressure section of the steam turbine generator, if a reheat cycle is being used. The reheated steam is routed to an intermediate pressure section of the steam turbine and then expanded to the low pressure section of the steam turbine generator to generate electrical power. The wet vapor exiting the low pressure section is sent to a condenser where it is converted to a liquid water. From the condenser, the liquid is pumped through an economizer section in the HRSG and the output of this economizer is split between the HRSG and the biomass boiler.

Figure 1:
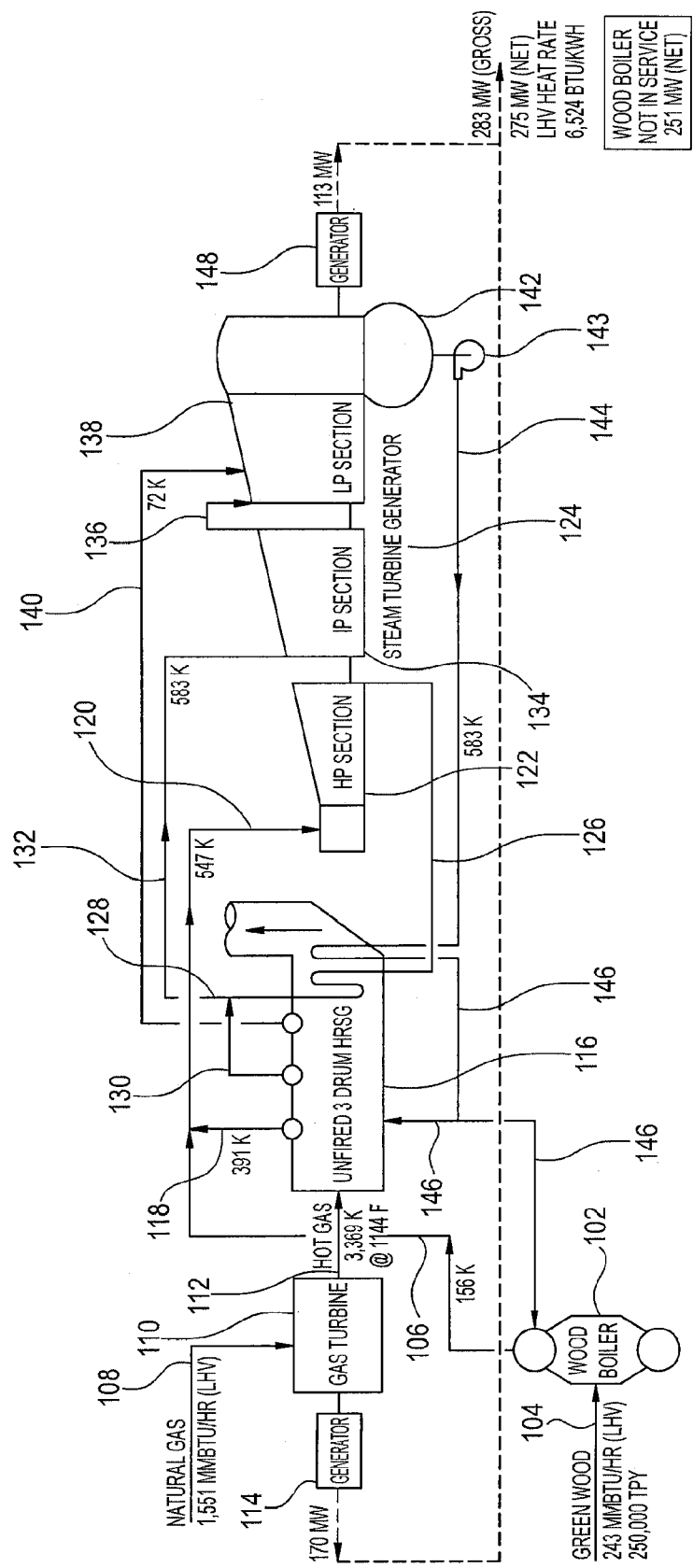
FIG. 1 is an exemplary embodiment of the hybrid cycle of the present disclosure.

It should be noted that the figures are not drawn to scale and that elements of similar structures or functions are generally represented by like reference numerals for illustrative purposes throughout the figures. It also should be noted that the figures are only intended to facilitate the description of the preferred embodiments.

DETAILED DESCRIPTION

The system and methods of the present disclosure allow for more efficient energy production from biomass fuel. The enhanced efficiency of the present method is achieved by combining a typical biomass fuel cycle with a natural gas or fossil fuel cycle in a hybrid process. Steam generated from the biomass fuel cycle is combined with steam generated from the natural gas or other fossil fuel cycle and the combined steam flow is then routed through a steam turbine generator. The proposed process combusts the biomass fuel separately from the natural gas. The combusted gases are kept separate, for post combustion processing prior to discharge to the atmosphere.

In a preferred embodiment such as that shown in FIG. 1, the biomass fired boiler operates in parallel with the combined cycle heat recovery boiler (HRSG). This has several effects. First, the operating steam pressure of the biomass boiler is no longer limited by the size of the steam turbine generator. Second, the steam from the biomass boiler can now operate in a reheat (or non reheat) type Rankine cycle. Third, a separate power generation cycle for the biomass fuel is avoided thereby resulting in capital economy and avoidance of separate operation staff. Fourth, the steam produced from the biomass fuel resource can displace the use of natural gas or fossil fuel as a supplemental fuel in the HRSG.

Typically, biomass processes are limited to using industrial class type of steam turbine generators. The combination of cycles described in the present disclosure permits the use of utility class steam turbine generators. Because utility class steam turbine generators are markedly more efficient than industrial class steam turbine generators, the ability to use a utility class steam turbine generator provides further efficiencies to the present system and methods over traditional systems for generation of electrical power from biomass.

A wide variety of biomass products can be used with the invention of the present disclosure. The fuel or feedstock can comprise any of renewable solid fuels such as green tree chips, forest residues, yard clippings, wood chips, urban waste wood, construction and demolition waste wood, sugar cane fiber (bagasse), or other agricultural waste.

The concepts of the present disclosure can also be used with high chlorine content fuels such as municipal solid waste (MSW) or refuse derived fuels (RDF). In applications using high chlorine content fuels, the steam temperature of the cycle will be reduced as compared to low chlorine content fuels. The present disclosure provides exemplary sources of biomass energy fuels, but the scope of the present disclosure is not limited to these specific examples. To the contrary, any biomass fuel source that is capable of producing steam temperatures compatible with the natural gas or other fossil fuel cycle can be used.

The biomass fuel may be brought to the plant site by truck and be unloaded, stored and reclaimed in the same manner as is the current practice in biomass operations.

High pressure steam can be generated from biomass fuel using any method known in the art. For example, the use of stoker firing, bubbling fluid bed, circulating fluid bed technology and the like are all within the scope of this disclosure. In a preferred embodiment, the steam boiler operating pressure and temperature will be at the high end of current practice so that the steam pressure and temperature derived from the biomass fuel cycle is on the same order as the steam pressure and temperature of the natural gas or fossil fuel cycle. In general, the steam generation process for the biomass fuel portion of the combined cycle will operate in a similar manner to ongoing biomass fuel power generation projects with the exception that the steam is not directly routed to a dedicated steam turbine generator. Instead, as will be discussed further below, the steam generated from the biomass fuel portion is combined with steam generated from the natural gas or fossil fuel cycle and the combined steam flow is routed to the steam turbine generator. Steam generated from natural gas or fossil fuel can be obtained by any means known in the art and the present disclosure is not limited to any specific method.

An exemplary embodiment of the present disclosure is shown in FIG. 1. FIG. 1 depicts an exemplary wood boiler 102 using green wood as a feedstock, but, as described above, the concepts of this disclosure are not limited to the use of a wood boiler 102 or green wood as a feedstock. The temperatures, loading values, and other characteristics discussed herein are exemplary and not intended to restrict the scope of the present disclosure.

In the exemplary embodiment, green wood 104 is supplied to a wood boiler. In the exemplary embodiment, the wood boiler 102 would receive 250,000 tons per year (TPY) of green wood 104 with a heat energy of 243 MMBTU/hr (LHV). Using processing methods standard in the industry and readily known to those of skill in the art, the green wood 104 is processed in the wood boiler 102 to produce steam. The output of steam 106 from the wood boiler 102 in the exemplary embodiment is 156,000 lbs/hr.

Natural gas 108 is processed through a gas turbine 110 to produce hot gas 112. The natural gas 108 process also creates energy, via a generator 114. In the exemplary embodiment, the output of energy from generator 114 is 170 MW. The hot gas 112 produced from the gas turbine 110 is output at a temperature of approximately 1144° F. at 3,369 lbs/hr. The hot gas 112 then enters a conventional heat recovery steam generator (HRSG) unit 116. In the exemplary embodiment, the HRSG 116 is an unfired three drum HRSG. The high pressure steam output 118 from the HRSG 116 in the exemplary embodiment is about 391,000 lbs/hr. The steam output 118 from the HRSG 116 is combined with the steam output 106 from the wood boiler 102. The combined steam flow 120 is then routed to a high pressure (HP) section 122 of the steam turbine generator 124. In the embodiment shown in FIG. 1, this steam line routes steam at approximately 547,000 lbs/hr.

After expanding to a lower pressure in the HP section 122 of the steam turbine generator 124, the steam 126 is returned to the HRSG and is reheated to its original temperature. The reheated steam 128 then returns to the steam turbine generator 124 to expand until all of the available work is extracted from the steam. The reheat cycle improves the performance of the steam turbine generator 124 and provides an added level of efficiency to the systems and methods disclosed herein.

A second steam output (intermediate pressure) 130 from the HRSG 116 is combined with the reheated steam 128 to form steam line 132 and routed to an intermediate pressure (IP) section 134 of the steam turbine generator 124. In the embodiment shown in FIG. 1, the combined steam line 132 routes steam at approximately 583,000 lbs/hr. After expanding in the IP section 134, the steam 136 is routed to a low pressure (LP) section 138 of the steam turbine generator 124.

The LP section 138 also receives a LP steam input 140 from the HRSG 116. In the exemplary embodiment, steam 140 is taken directly from the HRSG 116 and routed to the LP section 138 from the HRSG 116 at about 72,000 lbs/hr. This combines with the steam flow 136 and expands to a condenser 142. The condenser 142 receives the output of the LP section 138 of the steam turbine. The steam exiting the LP section 138 is condensed to liquid water and enters the condensate pump 143. The output 144 from the condensate pump 143 is then routed back through the HRSG economizer to heat the water. The heated water 146 is then supplied back into the HRSG 116 and to the wood boiler 102. In the exemplary embodiment, the output of energy from the steam turbine generator 148 is 112 MW.

The example shown does not use any supplemental firing in the HRSG. The use of supplemental firing in the HRSG can be used to replace the biomass steam source, when the biomass portion of the plant is out of service for maintenance. This allows the electrical output of the plant to be maintained, when the biomass plant is not operating.

The amount of steam coming from the biomass boiler is somewhat arbitrary and is tied to the amount of sustainable biomass fuel available. The case shown is based on an annual consumption of 250,000 tons of biomass per year. Large biomass plants in New England burn up to 500,000 tons per year.

An exemplary performance for the hybrid cycle is as follows:

| Power from combustion turbine | 170 MW |
| --- | --- |
| Engine fuel consumption | 1,551 MMBtu/hr (LHV) |

HRSG Steam Generation:

| HP Steam | 391,000 lb/hr @ 1792 psia, 1053° F. |
| --- | --- |
| Reheat Steam | 583,000 lb/hr @ 420 psia, 1050° F. |
| LP Steam | 72,000 lb/hr @ 76 psia, 546° F. |
| Biomass Steam Generation | 156,000 lb/hr @ 1800 psia, 950° F. |
| Biomass Fuel Consumption | 243 MMBtu/hr (LHV) |
| Condenser pressure | 1.1 psia |
| Power from steam turbine | 112.7 MW |
| Total plant net power output | 275 MW |

The LHV net station heat rate for this cycle is approximately 6590 Btu/kWh, which will vary depending on the level of biomass processing required. If the same amount of biomass fuel were burned in a conventional biomass power plant approximately 17 MW would be produced. The hybrid cycle produces an increase of 21 MW of electricity attributable to the firing of biomass fuel as described above. This is a performance increase of 23% in electricity production relative to traditional methods of biomass fuel use.

Various combustion turbine manufacturers offer predesigned fossil fuel based combined cycle packages, with the combustion turbine(s) as the prime mover for the combined cycle. The larger the combustion turbine, the more complex the combined cycle design. The intent of this complexity is to improve the overall efficiency of the power generation cycle.

Using the above approach and other optimization features, combined cycle power plants are able to achieve electrical production efficiencies of 50% or more. On the other hand, traditional renewable biomass fired power plants operate in the 23-25% efficiency range.

The hybrid concept is not limited to any specific combined cycle arrangement. For purposes of this example, a biomass fired boiler was combined with an unfired three drum HRSG and a single, three section, condensing steam turbine generator with no steam extractions. In other circumstances, other fossil fuel fired generation technologies utilizing a steam cycle could be used. In addition, the cycle can be used in cogeneration applications where steam created in the combined cycle and hybrid cycle are used in part, for industrial purposes. Furthermore, the hybrid concept is not limited to a reheat based, combined cycle. The concept is fully compatible with smaller prime movers which would not make use of a reheat feature in the HRSG and steam turbine portions of the power generation cycle.

Figure 2:
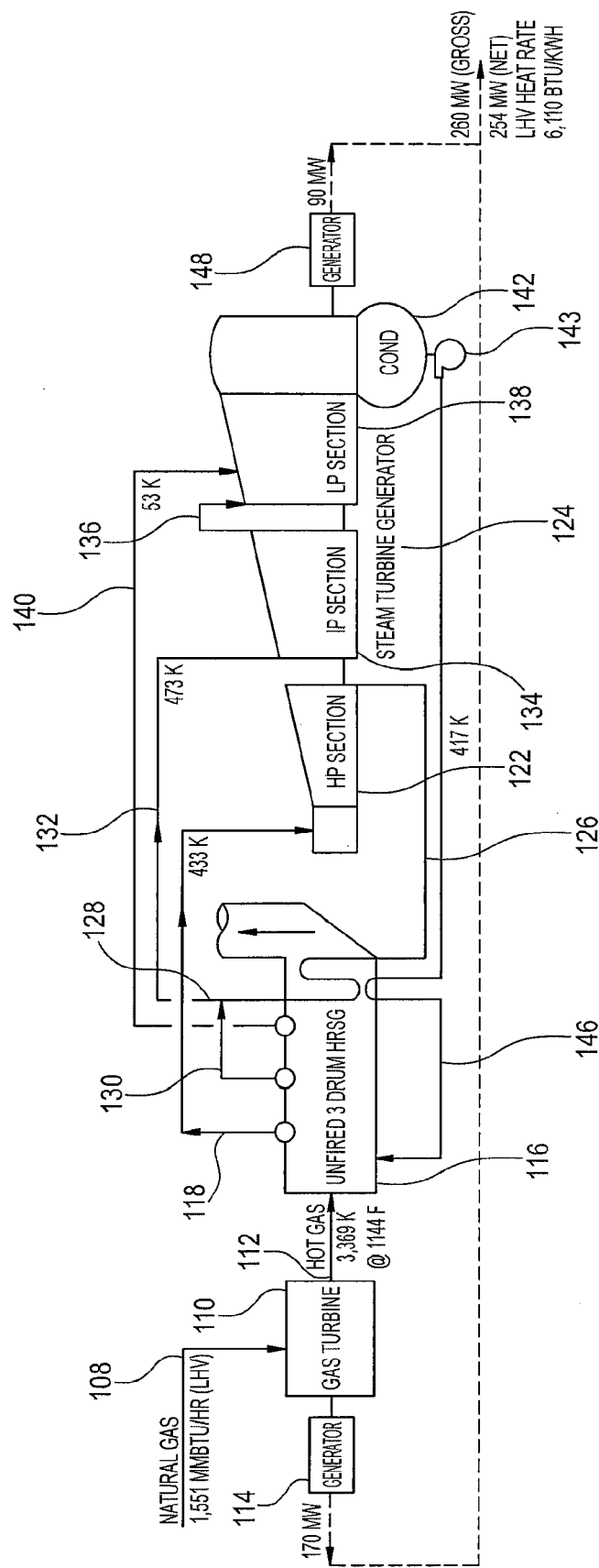
FIG. 2 is an exemplary embodiment of a natural gas fueled cycle of the prior art.

FIG. 2 depicts an exemplary standard combined cycle of the prior art that does not include a biomass fuel cycle. The process for this cycle is similar to that described above for the hybrid process, with the exception that the standard combined cycle does not include a steam input from the renewable energy cycle and does not recirculate the reheated water to the wood boiler. Using the same level of natural gas input, the standard combined cycle would have the following characteristics:

| Power from combustion turbine | 170 MW |
|---|---|
| Engine fuel consumption | 1,551 MMBtu/hr (LHV) |

HRSG Steam Generation:

| HP Steam | 433,000 lb/hr @ 1454 psia, 1050° F. |
|---|---|
| Reheat Steam | 474,000 lb/hr @ 376 psia, 1050° F. |
| LP Steam | 53,000 lb/hr @ 61.5 psia, 546° F. |
| Condenser pressure | 1.1 psia |
| Power from steam turbine | 90.4 MW |
| Total plant net power output | 253.9 MW |

The LHV net station heat rate from this cycle is 6110 Btu/kWh (49.8% efficient on a HHV basis).

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for generating electrical power comprising:
processing a first energy source to produce electricity via a coupled generator, a first exhaust combusted gas, and a by-product first steam flow via a coupled heat recovery steam generator;
processing a biomass fuel source, separately from the processing of the first energy source and the first exhaust combusted gas, to produce a second steam flow at matched temperature and pressure conditions to the by-product first steam flow, wherein the biomass fuel source is different than the first energy source and the matched temperature and pressure conditions are adjustable based on temperature and pressure conditions for the by-product first steam flow or the second steam flow;
combining the by-product first steam flow and the second steam flow, wherein the steam flows are combined after the by-product first steam flow is processed through the heat recovery steam generator and the combined steam flow is at or below a maximum flow of the by-product first steam flow produced from the first energy source via the coupled heat recovery steam generator; and
routing the combined steam flow through a steam turbine generator.

2. The method of claim 1 further comprising:
recirculating an output of the steam turbine generator for reheating;
reheating the steam; and
delivering the reheated steam to the steam turbine generator.

3. The method of claim 2 wherein the steam turbine generator comprises two or more sections and the output is obtained from a first section of the steam turbine generator and the reheated steam is delivered to a second section of the steam turbine generator.

4. The method of claim 1 further comprising:
collecting water at a condenser;
reheating the water; and
using the reheated water for the processing of the first energy source and the biomass fuel source.

5. The method of claim 1 wherein the first energy source is natural gas, fossil fuel, coal, or any combination thereof.

6. The method of claim 1 wherein the biomass fuel source is selected from one or more of the group of green tree chips, forest residues, yard clippings, wood chips, urban waste wood, construction and demolition waste wood, sugar cane fiber and agricultural waste.

7. The method of claim 1 wherein the steam turbine generator is a utility grade steam turbine generator.

8. A method for generating electrical power comprising:
processing a first energy source to produce electricity via a coupled generator, a first exhaust combusted gas, and a by-product first steam flow via a coupled heat recovery steam generator;
processing a biomass fuel source, separately from the processing of the first energy source and the first exhaust combusted gas, to produce a second steam flow at matched temperature and pressure conditions to the by-product first steam flow and the matched temperature and pressure conditions are adjustable based on temperature and pressure conditions for the by-product first steam flow or the second steam flow, wherein the biomass fuel source is different than the first energy source;
combining the by-product first steam flow and the second steam flow, wherein the steam flows are combined after the by-product first steam flow is processed through the heat recovery steam generator and the combined steam flow is at or below a maximum flow of the by-product first steam flow produced from the first energy source via the coupled heat recovery steam generator;
routing the combined steam flow through a steam turbine generator;
collecting water at a condenser;
reheating the water; and
using the reheated water for the processing of the first energy source and the biomass fuel source.

9. The method of claim 8 further comprising:
recirculating an output of the steam turbine generator for reheating; and delivering the reheated steam to the steam turbine generator.

10. A system for generating electricity comprising:
a first component for producing, from a first energy source, electricity via a coupled generator, a first exhaust combusted gas, and a by-product first steam flow;
a second component for producing, separately from the processing of the first energy source and the first exhaust combusted gas, a second steam flow from a biomass fuel source at matched temperature and pressure conditions to the by-product first steam flow, wherein the biomass fuel source is different than the first energy source and the matched temperature and pressure conditions are adjustable based on temperature and pressure conditions for the by-product first steam flow or the second steam flow;
a heat recovery steam generator for processing the by-product first steam flow;
a steam line which combines the by-product first and second steam flows after the by-product first steam flow is processed in the heat recovery steam generator and the combined steam flow is at or below a maximum flow of the by-product first steam flow produced from the first energy source; and
a steam turbine generator which extracts energy from the combined steam flow.

11. The system of claim 10 further comprising a condenser.

12. The system of claim 10 wherein the first energy source is natural gas.

13. The system of claim 10 wherein the first energy source is fossil fuel.

14. The system of claim 10 wherein the first energy source is coal.

15. The system of claim 10 wherein the biomass fuel source is selected from one or more of the group of green tree chips, forest residues, yard clippings, wood chips, urban waste wood, construction and demolition waste wood, sugar cane fiber and agricultural waste.

16. The system of claim 10 wherein the steam turbine generator is a utility grade steam turbine generator.

* * * * *